Nov. 25, 1952    W. D. PYLE ET AL    2,619,359
TRACTOR FIFTH WHEEL

Filed July 6, 1950    2 SHEETS—SHEET 1

INVENTORS
William D. Pyle
Clarence E. Kidwell
BY Victor J. Evans & Co.
ATTORNEYS

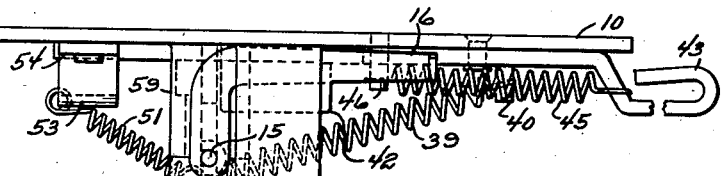
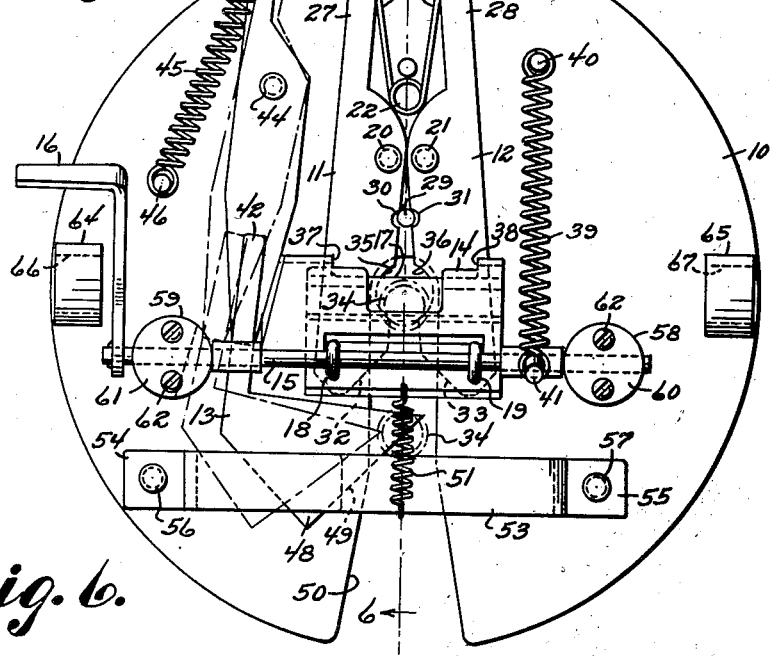
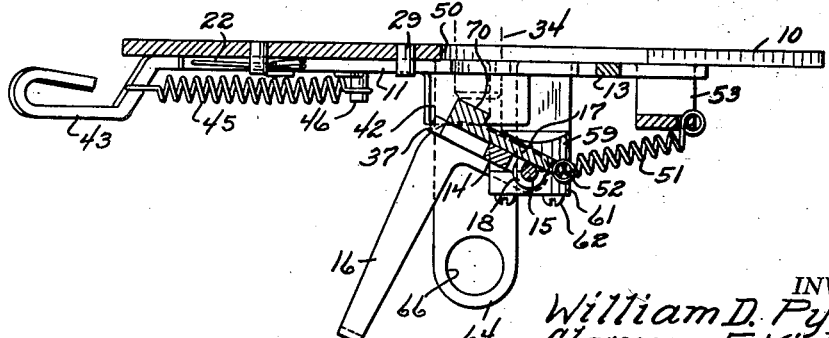

Patented Nov. 25, 1952

2,619,359

UNITED STATES PATENT OFFICE 2,619,359

TRACTOR FIFTH WHEEL

William D. Pyle and Clarence E. Kidwell,
Indianapolis, Ind.

Application July 6, 1950, Serial No. 172,292

3 Claims. (Cl. 280—33.05)

This invention relates to trailer hitches of the type automatically locking king pins of large trailer bodies on tractor platforms and which are commonly known as a fifth wheel, and in particular a pair of gripping jaws pivotally mounted on a plate with a locking jaw and with a locking key carried on the shaft journaled on the plate and actuated by a hand lever wherein the parts receive a king pin in either the free or locked position.

The purpose of this invention is to provide a fifth wheel or hitch for a trailer carrying tractor in which a king pin of a trailer is automatically locked when the tractor is backed under the trailer with the king pin passing through a slot in the plate or disc of the said fifth wheel.

Various types of trailer hitches have been provided for securing large trailer bodies to trailer carrying tractors and whereas different devices have been provided for automatically locking the king pin in the hitch it is difficult to provide an automatic locking device that may be manually released and that receives a king pin with the parts in either the locked or unlocked positions. With this thought in mind this invention contemplates a disc having a slot extended inwardly from the rear edge mounted on the platform of a tractor with king pin gripping jaws pivotally mounted on the under side of the disc, with a key for locking the jaws in the closed position, and a latch positioned to be actuated by a king pin entering the slot for releasing the jaws whereby the jaws are spread to receive the king pin and in which the jaws are snapped back to the position of locking a king pin therein and locked in this position as the king pin reaches the pin holding openings in the meeting edges of the jaws.

The object of this invention is, therefore, to provide means for constructing a fifth wheel for a tractor whereby the locking means of pin holding jaws is actuated by a pin passing into the jaws and in which the locking means is released to positively hold the jaws together as the pin reaches a socket therein.

Another object of the invention is to provide an improved tractor fifth wheel that may be mounted on platforms of tractors now in use without changing the design or parts of the tractor.

A further object of the invention is to provide a fifth wheel for tractors and the like which is of a simple and economical construction.

Other features and advantages of the invention will appear from the following description taken in connection with the drawings wherein:

Figure 4 is a side elevational view of the fifth wheel also showing the parts in the closed position.

Figure 5 is a view looking upwardly toward the under side of the disc showing the jaws and locking lever in the released position.

Figure 6 is a longitudinal section through the fifth wheel taken on line 6—6 of Figure 5.

Figure 1:
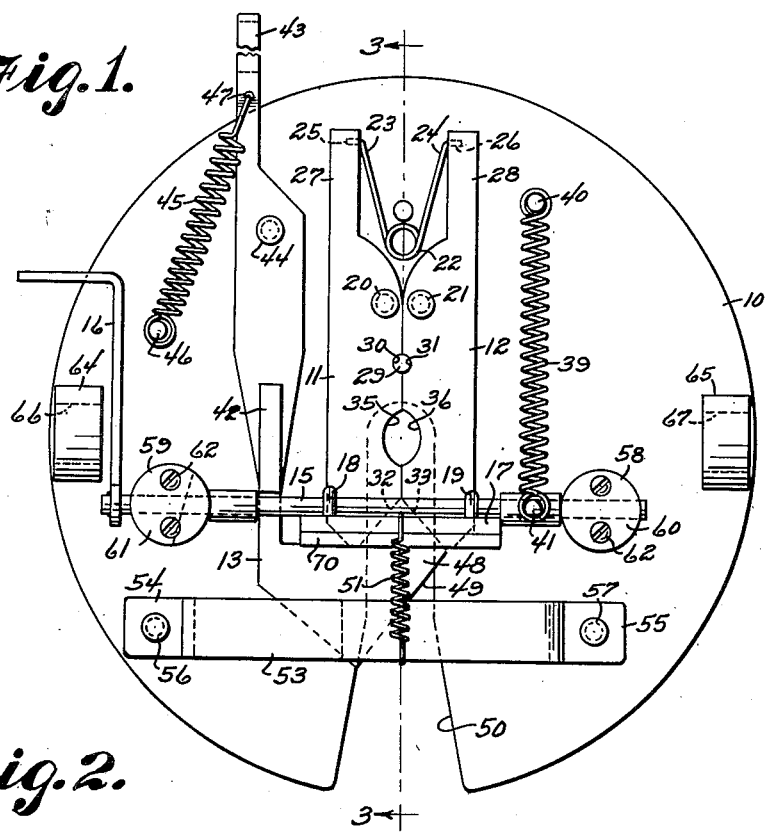
Figure 1 is a bottom view looking upwardly toward the under side of the fifth wheel showing the parts in the locked position.

Referring now to the drawings wherein like reference characters denote corresponding parts the improved fifth wheel or hitch of this invention includes a mounting plate or disc 10 having locking jaws 11 and 12 pivotally mounted thereon, a latch 13 also pivotally mounted on the disc, a locking key 14 carried by a shaft 15 journaled on the disc and having a hand lever 16 on the outer end, and a plate 17 pivotally mounted on the shaft by bearing elements 18 and 19.

The jaws 11 and 12 are pivotally mounted on the disc by pins 20 and 21, respectively. The jaws are urged to the closed position by a spring 22 the arms 23 and 24 of which are secured in notches 25 and 26 in the extended ends 27 and 28, respectively, of the jaws. The jaws are centered by a pin 29 that is positioned to coact with recesses 30 and 31 in the meeting edges of the jaws whereby both jaws stop on the center. The opposite ends of the jaws are provided with sloping surfaces 32 and 33 by which the jaws are forced open, to the position shown in Figure 5 when a king pin, as indicated by the numeral 34 is forced against the sloping surfaces. By this means the jaws are opened whereby the pin 34 passes into the semi-circular recesses 35 and 36 in the meeting edges of the jaws and in which the king pin is positively locked insuring the trailer of being secured therein as it is drawn over a highway.

Figure 2:
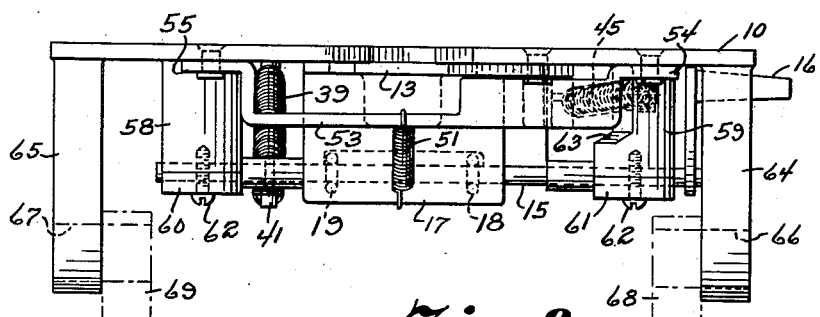
Figure 2 is a front elevational view looking toward the fifth wheel with the parts in the position as shown in Figure 1.
Figure 3:
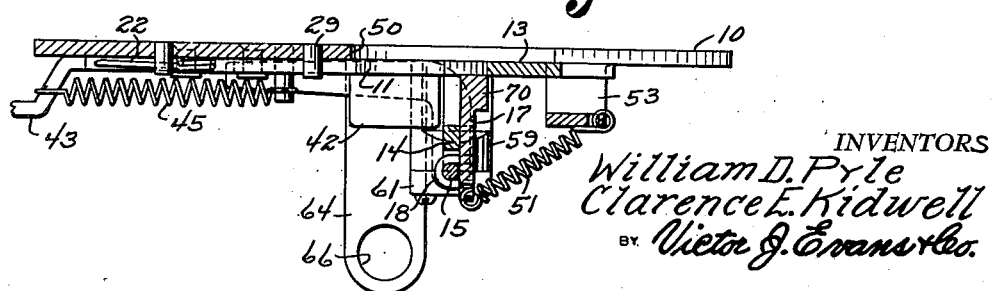
Figure 3 is a longitudinal section through the fifth wheel taken on line 3—3 of Figure 1.

Jaws 11 and 12 are locked in the closed or pin gripping positions by extensions 37 and 38 on the corners of the key 14, the key being urged to the locking position by the rotation of the shaft 15 through the medium of a spring 39, one end of which is positioned over a pin 40 on the under side of a disc 10 and the other over a pin 41 extended from the shaft 15. The key 14 is locked in the locking position or perpendicular to the disc 10 by a lug 42 extended downwardly from the latch 13, the lug being positioned in the path of the key 14 until a handle 43 on the outer end of the latch is manually moved inwardly, as illustrated by the dotted lines in Figure 5. The latch 13 is pivotally mounted on the disc 10 by a pin 44 and a spring 45 with one end mounted on a pin 46 on the disc 10 and with the other held in an opening 47 in the latch, urges the outer end of the latch outwardly away from the center and the head 48 on the opposite end inwardly. The head 48 is provided with a sloping surface 49 that extends diagonally across the entrance slot 50 of the disc 10 and as the king pin, as indicated by the numeral 34 enters the slot it engages the surface 49 thereby forcing the latch 13 outwardly to the position shown in dotted lines in Figure 5 whereby the lugs 42 release the key 14 and with the key 14 released the plate 17, which is pivotally mounted on the shaft 15 is forced over, by the pin 34, which is shown in dotted lines in Figure 6, to the position shown in Figure 6 thereby permitting the pin 34 to pass into the retaining opening shown by the recesses 35 and 36. The plate 17 is also urged to this position by a spring 51 which is attached to an eye 52 on the edge of the plate 17 at one end and to a brace 53 on the under side of the disc 10, at the other. The brace 53 is U-shaped, as shown in Figure 2 and flanges 54 and 55 at the ends thereof are secured to the disc 10 by rivets 56 and 57, respectively.

The shaft 15 is journaled in the lower ends of the bearing posts 58 and 59 and the posts are provided with caps 60 and 61, respectively, which are secured to the ends of the posts by screws 62. The inner surface of the post 59 is provided with a recess 63 that is positioned to receive the back of the latch 13, as shown in Figure 5.

The disc 10 is provided with depending posts 64 and 65 having openings 66 and 67, respectively, in the lower ends by which the fifth wheel is mounted on extensions 68 and 69 of the platform of a tractor by pins, bolts or other suitable means.

With the parts arranged in this manner the mounting plate or disc 10 is positioned on the platform of a trailer carrying tractor with the slots 50 extended rearwardly and in mounting the trailer body on the tractor the tractor is backed under the trailer with the king pin 34 of the trailer entering the slot 50, engaging the sloping surface 49 forcing the latch 13 outwardly to the position shown in dotted lines in Figure 5 in which position the lug 42 releases the key 14 and as the king pin engages a lug 70 on the upper edge of the plate 17 the plate is forced over about the shaft 15 in a counter clockwise direction as shown in Figure 6 whereby the key 14 is rotated so that the projections 37 and 38 thereof release the jaws 11 and 12. With the jaws 11 and 12 released the pin 34, engaging the sloping surfaces 32 and 33, forces the jaws open to the position shown in Figure 5 so that the pin 34 enters the recesses 35 and 36. When the pin reaches this position the spring 22 snaps the jaws 11 and 12 to a closed position over the pin and as the plate 17 and key 14 are released by the pin the spring 39 urges these parts back to the vertically disposed position, perpendicular to the disc 10 so that the projections 37 and 38 lock the gripping jaws in the closed position. At the same time the spring 45 snaps the handle 43 outwardly with the latch 13 moving inwardly to the position shown in Figure 1 and in this movement the lug 42 takes a position against the end of the key 14.

With the elements in these positions the king pin is positively locked in the socket formed by the recesses 35 and 36 in the jaws and the trailer may be conveyed without danger of being released from the tractor.

To release the king pin from the wheel it is necessary to move the handle 43 of the latch 13 inwardly and, with the key 14 released by the lug 42 the lever 16 is moved downwardly to the position shown in Figure 6 and, with the spring 51 causing the plate 17 to follow the king pin is free to slide outwardly through the slot 50.

It will be understood that modifications may be made in the design and arrangement of the parts without departing from the spirit of the invention.

What is claimed is:

1. A tractor hitch comprising a mounting plate having a slot extended inwardly from one end, a pair of holding jaws having beveled outer ends and semi-circular recesses in the meeting edges pivotally mounted on the under surface of the plate, a shaft positioned transversely of the slot journaled on the under surface of the plate and having a key thereon for locking the jaws in the closed position, a latch pivotally mounted on the plate and having a beveled end extended across the slot and positioned to be actuated by a pin entering the slot, said latch having means thereon for retaining the key in the position of locking the jaws in the closed position, and means resiliently urging the latch to the position whereby the key is held in the position of locking the jaws.

2. A tractor hitch comprising a mounting plate having a slot extended inwardly to the center thereof, a pair of holding jaws having beveled outer ends and semi-circular recesses in the meeting edges pivotally mounted on the under surface of the plate and positioned with the meeting edges on the center of the said slot, a shaft positioned transversely of the slot journaled on the under surface of the plate and having means thereon for locking the jaws in closed positions, a latch pivotally mounted on the plate and having a beveled outer end extended across the slot and positioned to be actuated by a pin entering the slot for releasing the jaws, said latch having means thereon for retaining the jaw locking means in the locking positions until actuated by a pin engaging the beveled outer end thereof, and means resiliently urging the latch to the position of holding the locking means of the jaws in the locking positions.

3. In a tractor hitch, the combination which comprises a mounting plate having an inwardly extended slot, a pair of holding jaws having beveled outer ends with semi-circular recesses in the meeting edges pivotally mounted on the under surface of the plate with the meeting edges thereof on the center of the slot of the plate, a shaft positioned transversely of the slot journaled on the under surface of the plate and having a key thereon with projections at the ends for locking the jaws in closed positions, a latch pivotally mounted on the plate and having a beveled outer end extended across the slot and positioned to be actuated by a pin entering the slot, said latch having a lug thereon positioned to engage the key of the shaft for retaining the key in the position of locking the jaws in the closed position, a spring for urging the latch to the positions holding the jaws in the closed position, and a spring for actuating the shaft to hold the key in the position of locking the jaws of the closed position.

WILLIAM D. PYLE.
CLARENCE E. KIDWELL.

REFERENCES CITED

The following references are of record in the file of this patent:

UNITED STATES PATENTS

| Number | Name | Date |
|---|---|---|
| 2,215,839 | Ranger et al. | Sept. 24, 1940 |
| 2,411,404 | Winn | Nov. 19, 1946 |